United States Patent
Da Costa Pito et al.

(10) Patent No.: US 11,701,842 B2
(45) Date of Patent: Jul. 18, 2023

(54) FLAP FOR A MOTOR VEHICLE SHUT-OFF DEVICE AND METHOD FOR MANUFACTURING SUCH A FLAP

(71) Applicant: Valeo Systemes Thermiques, Le Mesnil Saint Denis (FR)

(72) Inventors: Sergio Da Costa Pito, Le Mesnil Saint Denis (FR); Thomas Nore, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 891 days.

(21) Appl. No.: 16/478,657

(22) PCT Filed: Jan. 3, 2018

(86) PCT No.: PCT/FR2018/050007
§ 371 (c)(1),
(2) Date: Jul. 17, 2019

(87) PCT Pub. No.: WO2018/134492
PCT Pub. Date: Jul. 26, 2018

(65) Prior Publication Data
US 2019/0366652 A1  Dec. 5, 2019

(30) Foreign Application Priority Data
Jan. 17, 2017 (FR) ....................... 1750338

(51) Int. Cl.
*B29C 70/52* (2006.01)
*B60K 11/08* (2006.01)
(Continued)

(52) U.S. Cl.
CPC ............ *B29C 70/52* (2013.01); *B60K 11/085* (2013.01); *B29C 45/14786* (2013.01);
(Continued)

(58) Field of Classification Search
CPC .............. B60K 11/085; B60K 11/08; B60K 2001/0411; F01P 7/10
See application file for complete search history.

(56) References Cited

U.S. PATENT DOCUMENTS 10,391,855 B2 * 8/2019 Brueckner ........... B60K 11/085
2002/0004368 A1 * 1/2002 Denk .................. F24F 13/1426
251/308
(Continued)

FOREIGN PATENT DOCUMENTS

DE   3824757 A1   2/1989
DE   19504256 A1 * 8/1996
(Continued)

OTHER PUBLICATIONS

Office Action issued in corresponding European Patent Application No. 18 703 040.8, dated Sep. 7, 2021 (5 pages).
(Continued)

*Primary Examiner* — Long T Tran
(74) *Attorney, Agent, or Firm* — Osha Bergman Watanabe & Burton LLP

(57) ABSTRACT

The invention relates to a shut-off flap (26) for a motor vehicle shut-off device, notably for a device for shutting off an air inlet in the front face of a motor vehicle, comprising a flap body (28), the flap body (28) being at least partially made of a fibre reinforced composite material, notably one that uses continuous reinforcing fibres (42, 44). The invention also relates to a motor vehicle shut-off device comprising such a flap and to methods of manufacturing this flap and this shut-off device for a motor vehicle.

11 Claims, 6 Drawing Sheets

(51) Int. Cl.
*B29C 45/14* (2006.01)
*B29C 70/68* (2006.01)
*B29K 307/04* (2006.01)
*F01P 7/10* (2006.01)
*F24F 13/14* (2006.01)

(52) U.S. Cl.
CPC .......... *B29C 70/68* (2013.01); *B29K 2307/04* (2013.01); *F01P 7/10* (2013.01); *F24F 13/1426* (2013.01)

(56) References Cited

U.S. PATENT DOCUMENTS

| | | | |
|---|---|---|---|
| 2012/0110909 A1 | 5/2012 | Crane et al. | |
| 2014/0308890 A1 | 10/2014 | Schneider | |
| 2016/0089971 A1* | 3/2016 | Asai | B60K 11/085 |
| | | | 296/193.1 |
| 2016/0288625 A1* | 10/2016 | Uhlenbusch | F24F 13/14 |
| 2019/0282086 A1 | 9/2019 | Cohen et al. | |
| 2019/0299747 A1* | 10/2019 | Lanard | B60K 11/085 |
| 2020/0039345 A1* | 2/2020 | Korson | B60K 11/04 |

FOREIGN PATENT DOCUMENTS

| | | |
|---|---|---|
| DE | 102015109227 A1 | 12/2016 |
| EP | 0982222 A2 | 3/2000 |
| EP | 3002145 A1 * | 4/2016 |
| FR | 2992590 A1 | 1/2014 |
| FR | 3024389 A1 | 2/2016 |
| JP | 2007-092716 A | 4/2007 |
| JP | 2008-173782 A | 7/2008 |
| JP | 2015020658 A | 2/2015 |
| JP | 2016-068738 A | 5/2016 |
| JP | 2019-518549 A | 7/2019 |
| WO | 2006/056359 A1 | 6/2006 |
| WO | 2014-001430 A1 | 1/2014 |
| WO | 2018/067288 A1 | 4/2018 |

OTHER PUBLICATIONS

International Search Report and Written Opinion issued in corresponding International Patent Application No. PCT/FR2018/050007, dated May 4, 2018 (14 pages).

Notice of Reason for Rejection in corresponding Japanese Application No. 2019-538385, dated May 7, 2021 (17 pages).

Second Office Action in corresponding Chinese Application No. 201880007268.4, dated Dec. 2, 2022 (10 pages).

* cited by examiner

FLAP FOR A MOTOR VEHICLE SHUT-OFF DEVICE AND METHOD FOR MANUFACTURING SUCH A FLAP

The present invention relates to a flap for a motor vehicle shut-off device and a shut-off device comprising at least one such flap. The invention also relates to a method for manufacturing a flap for a motor vehicle shut-off device, particularly for a device for shutting off an air inlet in the front face of a motor vehicle, sometimes known as an AGS (Active Grill Shutter).

FIG. 1 is a longitudinal cross-sectional schematic view of the front part of a known motor vehicle 10. As shown, this motor vehicle 10 is provided with a heat exchange device 12 arranged between one or more grills 14, fixed to the body of the motor vehicle, and the engine 16 of the motor vehicle. Here, the grills 14 are separated horizontally by the bumper 18 of the motor vehicle 10. In order to control the flow of air reaching the heat exchange device 12, a device 20 for shutting off an air inlet in the front face of a motor vehicle is arranged on the path of this flow of air, upstream of the heat exchanger 12, as close to the grills 14 as possible.

As shown in FIG. 2, such a shut-off device 20 essentially consists of a frame 22, defining at least one opening 24, here two openings 24, and flaps 26, mounted pivotably on the frame 22 in order to close the openings 24 selectively. The pivoting of the flaps 26 makes it possible to let more or less air through the grills 14, to the heat exchanger 12, depending on the needs thereof and/or the speed of the motor vehicle. By closing off the grills 14, it is possible to improve the aerodynamics of the motor vehicle and thus limit its fuel consumption, particularly at high speeds.

The flaps 26 are generally made from a plastic material, the flaps 26 being for example injection molded. However, the flaps 26, which are very long relative to their other dimensions, are subject to significant stresses in operation, particularly to bending and torsional stresses. For example, the wind blows on the flaps 26 when they are closed. In addition, the pivoting of the flaps 26 is controlled by actuators transmitting pivoting torque to the flaps 26, generally to a longitudinal end of the flap. These stresses can cause deformations of the flaps 26 that then prevent them from being able to shut off the grill correctly. The satisfactory operation of the shut-off device on which the flaps are mounted is then disrupted.

In the past, producing a body 28 for such a flap 26 has been proposed as shown in FIG. 3, in a partial cutaway view. This body 28 is hollow, made up of two rigidly connected strips 30 (or shells). These strips 30 are produced by extrusion of a plastic material. The strips 30 have reinforcing protrusions 32, here in the form of ribs. The body 28 is completed by two end pieces 34, 36, produced by injection and rigidly connected to the ends of the body 28 to form the flap 26. The end pieces 34, 36 particularly form protrusions 38, 40 for fixing to the frame 22 of the shutter 20 and a protrusion, not shown in FIG. 3, for engaging with an actuator for controlling the pivoting of the flap 26.

The invention aims to further improve the stiffness of the flaps of such a shut-off device.

To this end, the invention proposes a shut-off flap for a motor vehicle shut-off device, particularly for a device for shutting off an air inlet in the front face of a motor vehicle, comprising a flap body, the flap body being at least partially made from a fiber-reinforced composite material, particularly a continuous fiber-reinforced composite material.

Thus, advantageously, the flaps according to the invention are made from a composite material, reinforced with fibers, particularly continuous fibers. The flaps thus offer greater resistance to the stresses to which they are subject than the known flaps of the prior art.

According to preferred embodiments, the flap according to the invention comprises one or more of the following features, taken individually or in combination:
- the flap body has a hollow, closed contour cross-section;
- the flap body comprises two strips fixed to each other, at least one of the two strips preferably being made from a fiber-reinforced composite material, particularly a continuous fiber-reinforced composite material, more preferably each of the two strips being made from a fiber-reinforced composite material, particularly a continuous fiber-reinforced composite material;
- the flap body is monolithic;
- the shut-off flap also comprises at least one, preferably two end pieces attached to or integrally formed with the flap body, the two end pieces preferably being made from a plastic material;
- the flap body comprises an insert made from a thermoplastic material with reinforcing fibers, particularly continuous reinforcing fibers, the rest of the flap body being made from a plastic material, with or, preferably, without reinforcing fibers, particularly with or, preferably, without continuous reinforcing fibers;
- at least part of the flap is overmolded on the insert, the part preferably forming a portion of the flap body and, more preferably, ends of the shut-off flap on a frame of the motor vehicle shut-off device, particularly the device for shutting off an air inlet in the front face of a motor vehicle;
- the flap body is hollow, with a closed contour cross-section, the flap body comprising at least one of an insert forming a portion of the closed contour or in a portion of the closed contour, and an insert extending between two opposite faces of the closed contour, particularly between the two opposite faces having the largest areas;
- the shut-off flap comprises a plurality of inserts extending between two opposite faces of the closed contour, particularly the two opposite faces having the largest areas, the inserts preferably being equally distributed in a transverse direction of the flap body, perpendicular to the direction of extension of the inserts;
- the reinforcing fibers extend:
  - substantially in a longitudinal direction of the flap body, and/or
  - in a transverse direction of the flap body, and/or
  - in one, preferably two secant directions of extension, oriented at an angle relative to the longitudinal direction of the flap body and/or relative to the transverse direction of the flap body, and
- the reinforcing fibers are made from a material selected from glass, carbon, and a mixture of these materials.

According to another aspect, the invention also relates to a motor vehicle shut-off device, particularly a device for shutting off an air inlet in the front face of a motor vehicle, comprising:
- a frame provided with at least one flap as described above in all of the combinations thereof, the at least one flap being suitable for pivoting between at least an open position and a shut position, and
- at least one actuator suitable for controlling the pivoting of the flap relative to the frame, preferably about a longitudinal axis of the flap.

According to another aspect, the invention relates to a method for manufacturing a flap for a motor vehicle shut-off device, in particular for an air inlet in the front face of a motor vehicle, comprising a step of producing a flap body at least partially made from a fiber-reinforced composite material, particularly a continuous fiber-reinforced composite material.

Preferably, the method according to the invention has one or more of the following features, taken individually or in combination:
- the fibers are made from a material selected from glass, carbon, and a mixture these materials;
- the method can also comprise the steps consisting of:
  - providing two end pieces, and
  - fixing the end pieces to the longitudinal ends of the flap body;
- the flap body is produced by implementing a method of pultrusion, pull-winding or overmolding of an organic sheet insert;
- the flap body is produced by implementing a pultrusion or pull-winding method comprising a step consisting of soaking the reinforcing fibers in a resin, the resin being one of an unsaturated polyester, a polyurethane, a vinylester, an epoxide, a thermoplastic such as poly butylene terephthalate or polypropylene, or a mixture thereof;
- the flap body is produced by overmolding an organic sheet insert forming part of the flap body, the end pieces preferably being overmolded on the insert; and
- the flap body is produced by coextrusion, the flap body preferably comprising at least one insert, the insert and the rest of the flap body being at least partially produced by coextrusion.

According to another aspect, the invention also relates to a method for manufacturing a motor vehicle shut-off device, in particular for an air inlet in the front face of a motor vehicle, comprising the steps of:
- producing at least one flap by implementing a method for manufacturing a flap for a motor vehicle shut-off device as described above in all of the combinations thereof,
- providing a frame, and
- aiming the at least one flap to the frame, so that it can pivot about a longitudinal axis of the flap.

The invention will be more clearly understood on reading the following description, given as a non-limitative illustration, with reference to the attached drawings, in which:

In the description below, identical elements or elements with identical functions have the same reference sign. In order to make the description concise, only the differences between the embodiments disclosed are described.

FIG. 4 shows a first example of a flap 26 for a device 20 for shutting off an air inlet in the front face of a motor vehicle, as shown in FIG. 2.

Figure 4:
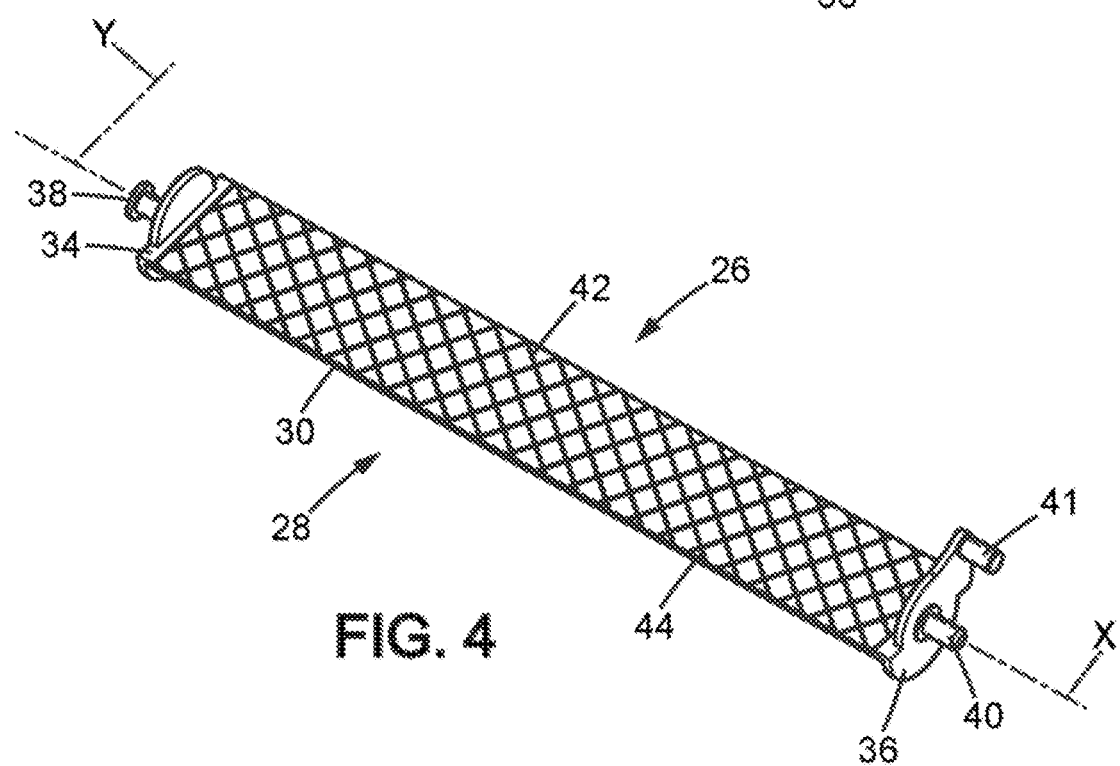
FIGS. 4 and 5 are partial cutaway views of two novel examples of a flap that can be implemented in the shut-off device in FIG. 2.

In this example, the flap body 28 is made up of a profile made from a composite material, for example formed by two strips 30 assembled together. The flap body 28, due to being in the form of a closed contour hollow profile, already has high stiffness. However, the use of a composite material makes it possible to further increase the stiffness of this flap body 28. Here, composite material is given to mean a plastic material comprising a reinforcing filler. Here, this reinforcing filler is made up of reinforcing fibers, particularly continuous reinforcing fibers 42, 44. In FIG. 4, the reinforcing fibers 42, 44 extend at an angle relative to the longitudinal direction X of the flap 26 and relative to the transverse direction Y of the flap 26. In this case, the reinforcing fibers 42, 44 extend forming an angle of approximately 45° with the longitudinal direction X and the transverse direction Y. Here, continuous fibers is given to mean fibers the length of which is greater than 50 mm. In this case, the continuous reinforcing fibers 42, 44 extend uninterrupted in the flap body 28. These continuous reinforcing fibers 42, 44 make it possible to obtain a particularly effective reinforcement of the flap body 28. The reinforcing fibers 42, 44 are for example made from glass, carbon, or a mixture of these materials.

In a variant, the flap body 28 is monolithic. In other words, the flap body is integrally formed, and not made from two strips or shells 30, produced separately and then fixed to each other to form the flap body 28.

The two end pieces 34, 36 are for example force-fitted into the flap body 28. Other means of fixing the end pieces 34, 36 can of course be implemented, and these two end pieces 34, 36 can in particular be clipped, glued or screwed into or onto the flap body 28.

In this case, the two end pieces 34, 36 each form a protrusion 38, 40, or a finger or pin, for being received in a complementary recess in a frame 22, in order to permit the rotation of the flap. Here, these protrusions 38, 40 have a cylindrical shape with a circular cross-section. The protrusions 38, 40 are produced as an extension of the longitudinal axis X of the flap 26, so that the flap 26, when mounted on the frame 22, is suitable for pivoting substantially about its longitudinal axis X. The protrusion 38 also has a ring on its end which, by engaging with an appropriately-shaped recess, limits or even prevents the translation of the flap 26 in the longitudinal direction X. It must be noted here that the protrusion 40 of the other end piece 36 can also or alternatively have this ring on its end. The end piece 36 further has, as shown, a second protrusion 41, here substantially cylindrical in shape, intended for engaging with the actuator controlling the pivoting of the flap 26 relative to the frame.

Figure 5:
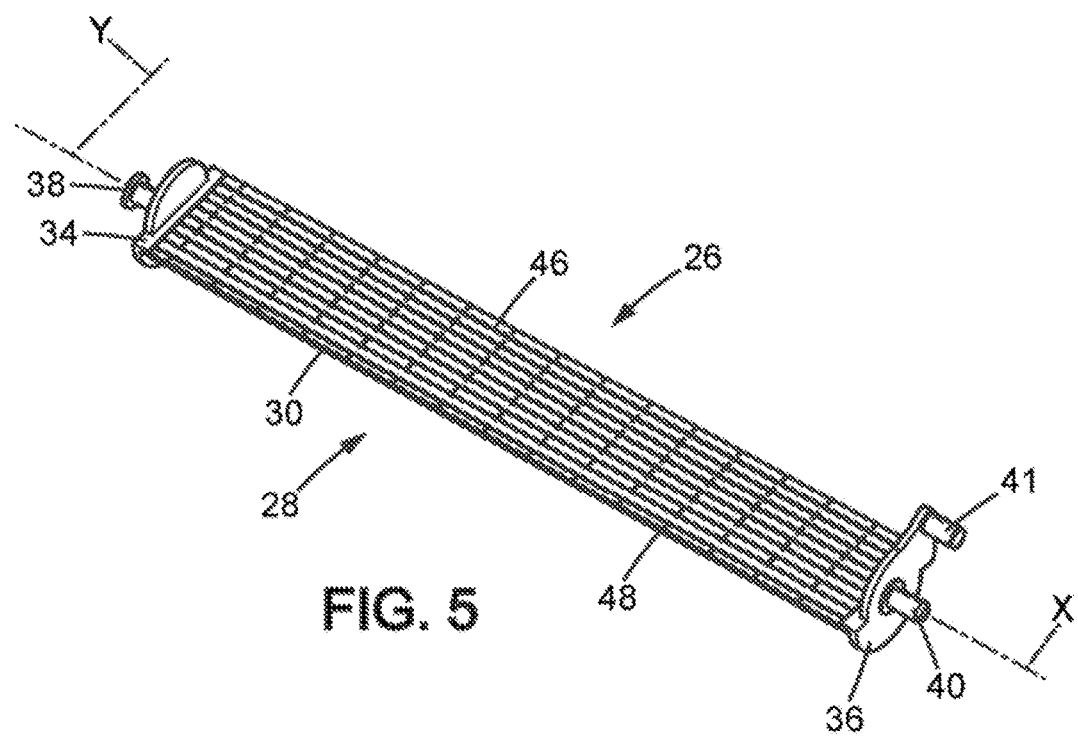

In the example in FIG. 5, first continuous reinforcing fibers 46 extend substantially in the longitudinal direction X of the flap body 28, while second continuous or non-continuous reinforcing fibers 48 extend substantially in the transverse direction of the flap body 28, perpendicular to the first reinforcing fibers 46.

According to a first variant (not shown), all of the continuous fibers extend in the same direction. In this case, the continuous fibers do not intersect, unlike in the examples in FIGS. 4 and 5. According to another variant (not shown), the fibers are unevenly distributed, i.e. the distance between two adjacent fibers is not the same for all of the pairs of adjacent fibers. The fibers can also, according to another variant (not shown), extend in a non-parallel manner, i.e. without forming a bundle of fibers all parallel two by two.

For example, each fiber can extend forming a constant angle with the longitudinal direction X of the flap body 28, without this angle being identical for all of the fibers.

Figure 6:
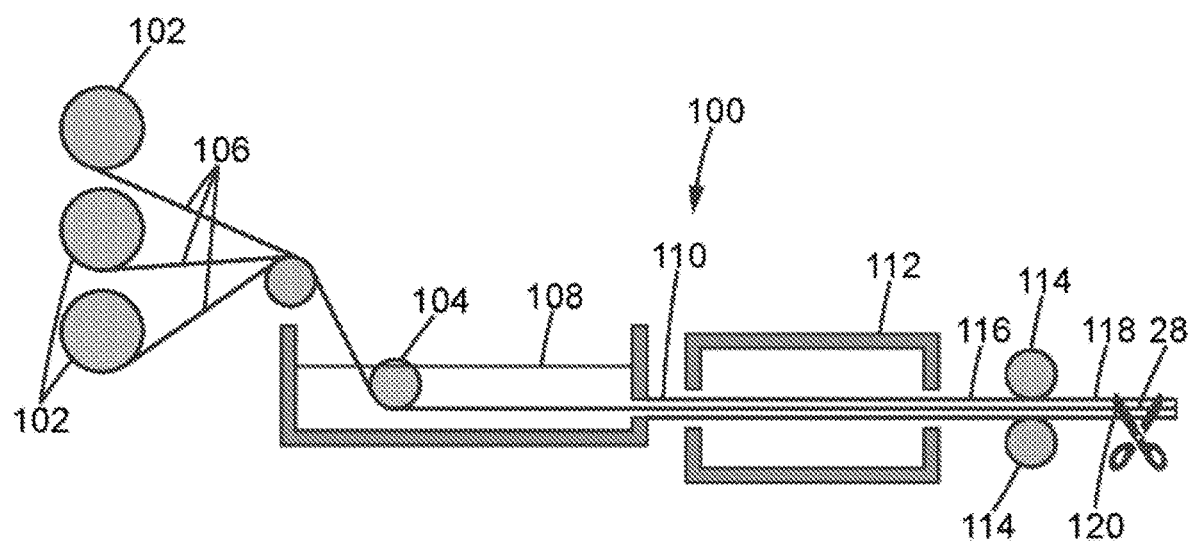
FIGS. 6 and 7 are schematic views of installations making it possible to manufacture the flaps in FIGS. 4 and 5.

FIG. 6 shows a pultrusion facility 100 that can be implemented to produce a flap body 28 including continuous reinforcing fibers. This facility 100 essentially comprises:

- rolls or reels 102 of continuous reinforcing fibers 106, in the form of yarn for example. The reinforcing fibers are for example made from glass, carbon, or a mixture of these materials;
- a roller 104 for tensioning the reinforcing fibers 106;
- a bath 108 of resin, in this case thermosetting resin, in which the fiber 106 is immersed to obtain an impregnated fiber 110;
- a die 112 that heats the impregnated fiber 110 and gives it the desired shape, while making it possible to cure the thermosetting resin;
- rollers 114 or any other means of tensioning and/or stretching the composite material 116 obtained after the resin has cured, to obtain a profile 118 made from a composite material.

Advantageously, at the output from the rollers 114, all that remains is to cut the profile 118 to the desired length, using any suitable cutting tool 120, to obtain a flap body 28 or a strip 30.

The resin implemented can particularly be one of an unsaturated polyester, a polyurethane, a vinylester, an epoxide, a thermoplastic such as butylene terephthalate or polypropylene, or a mixture thereof.

A motor vehicle shut-off device can then be produced by providing a frame, an actuator, and two end pieces. The two end pieces are fixed to the flap body, the latter optionally being obtained by fixing two strips obtained as stated above. The end pieces can be fixed to the flap body by force-fitting into the flap body, by gluing, screwing, clipping, or any other suitable fixing means. The flap is then mounted on the frame, the cylindrical protrusions of the two end pieces being received in recesses with a complementary cross-section in the frame. Finally, the actuator is fixed to the flap, particularly to the control protrusion 41 and to the frame, if applicable.

Figure 7:
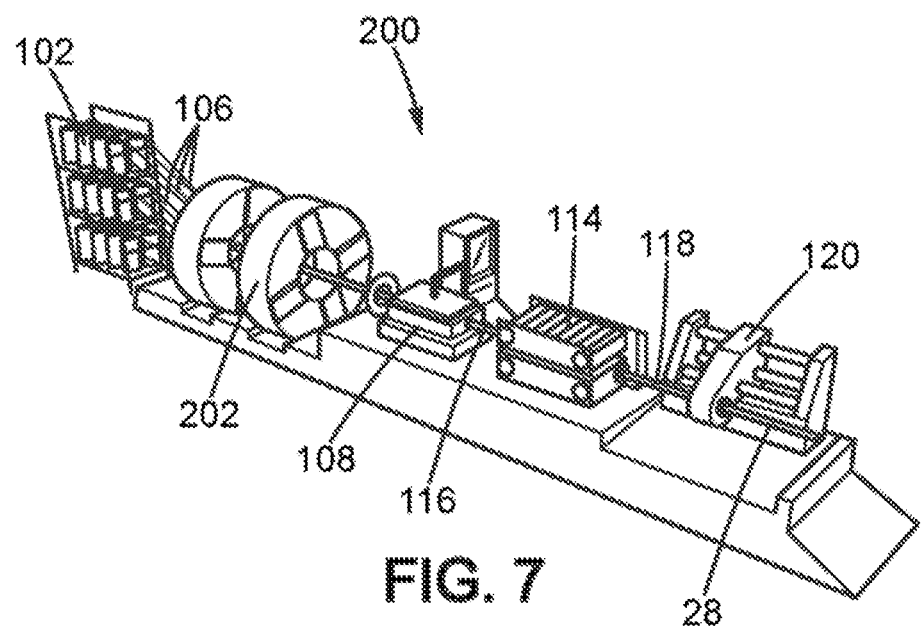

FIG. 7 shows a pull-winding facility 200 that can be implemented to produce a flap body 28 as described above. In this facility 200, elements that are identical or have an identical function to the elements of the pultrusion facility 100 in FIG. 6 have the same reference sign and are not described in further detail below.

The pull-winding facility 200 essentially differs from the pultrusion facility 100 in FIG. 6 by the presence of a device 202 making it possible to orient the reinforcing fibers with an angle of inclination relative to the longitudinal axis and/or relative to the transverse axis of the profile ultimately obtained 118. Such a method makes it possible to obtain a flap body 28 or a strip 30 that is even stronger than with a pultrusion method as described above.

Figure 8:
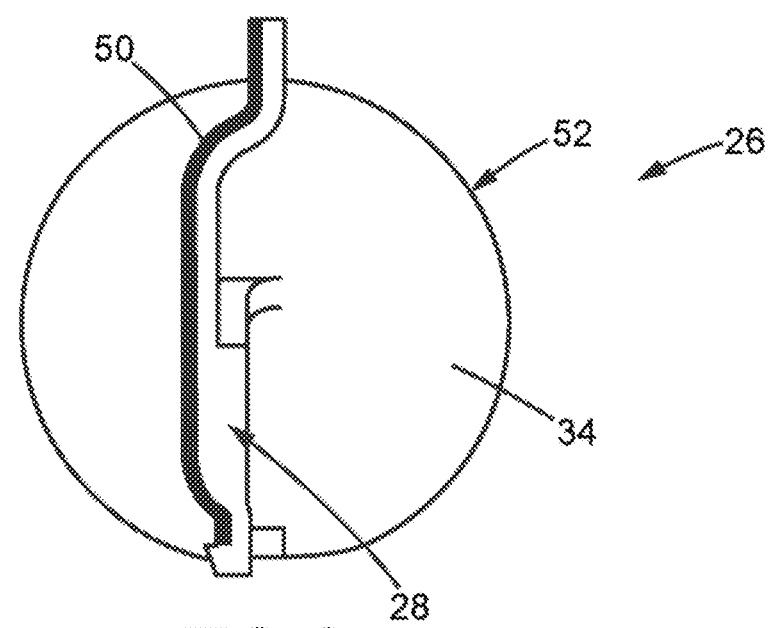
FIG. 8 is a schematic view of a third example of a flap that can be implemented in the device in FIG. 2.

FIG. 8 shows a third embodiment of a flap 26.

Here, the flap 26 essentially comprises an insert 50 onto which a part 52 of the flap 26 is fixed. The part 52 comprises, as shown, a portion of the flap body 28 and the two end pieces 34, 36. The part 52 is preferably overmolded on the insert 50, the part 52 being made from a plastic material, optionally without reinforcing fibers or with continuous or non-continuous reinforcing fibers. Here, the flap body 28 is in the form of a strip, but it can also be hollow, with a closed contour cross-section.

The insert 50 is an organic sheet (or "organo-sheet"), i.e. a sheet made from a fiber-reinforced thermoplastic material, particularly a continuous fiber-reinforced thermoplastic material. The reinforcing fibers can particularly be made from glass, carbon, or a mixture of glass and carbon.

The insert 50 can particularly be substantially the shape of the strip 30 or the flap body 28, or substantially the shape of a face of the strip or the flap body. The flap 26 can then be made by overmolding, particularly by injection overmolding, such an insert 50 in the form of an organic sheet. In this case, the end pieces 34, 36 can be integrally formed with the part of the strip 30 or the flap body 28 overmolded on the insert 50.

Figure 1:
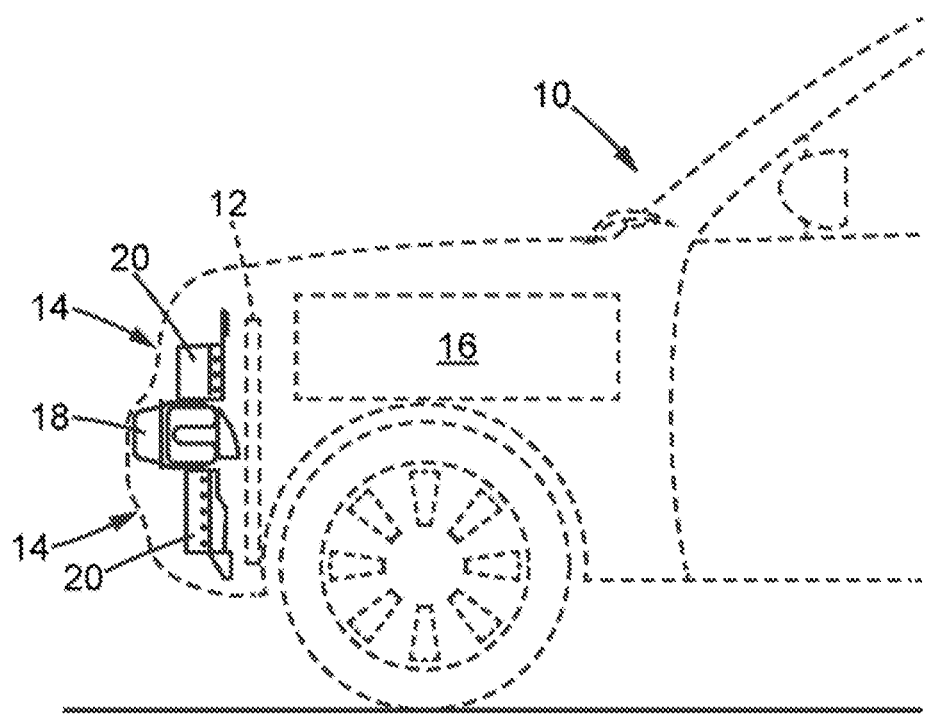
FIG. 1 is a longitudinal cross-sectional schematic view of the front part of a motor vehicle.
Figure 2:
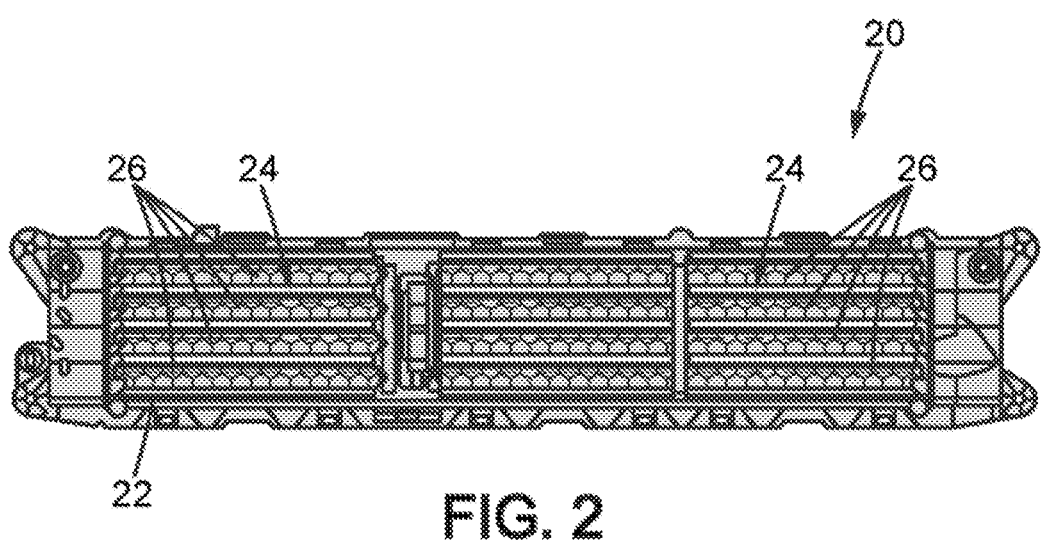
FIG. 2 shows an example of a device for shutting off an air inlet in the front face of a motor vehicle.
Figure 3:
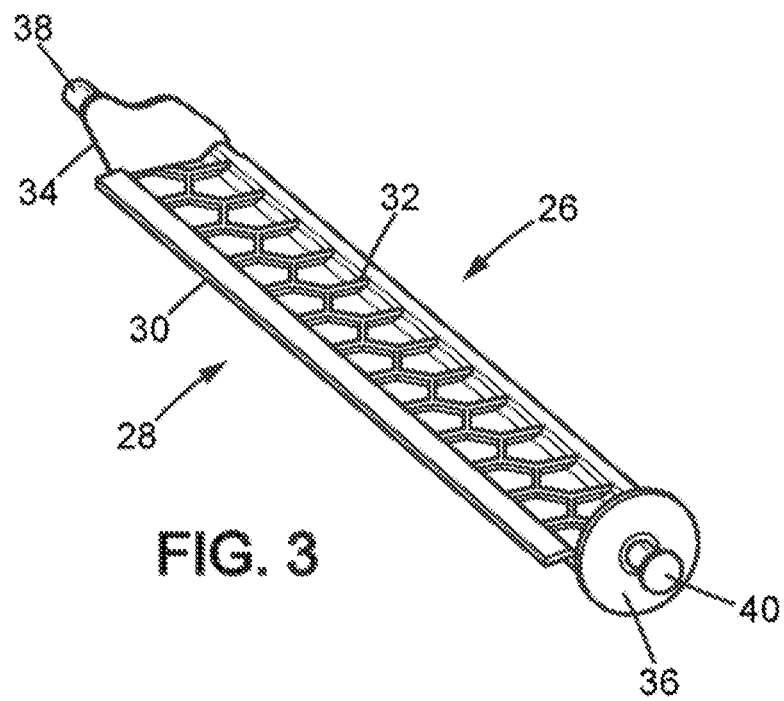
FIG. 3 is a partial cutaway perspective view of a known example of a flap that can be implemented in the shut-off device in FIG. 2.
Figure 9:
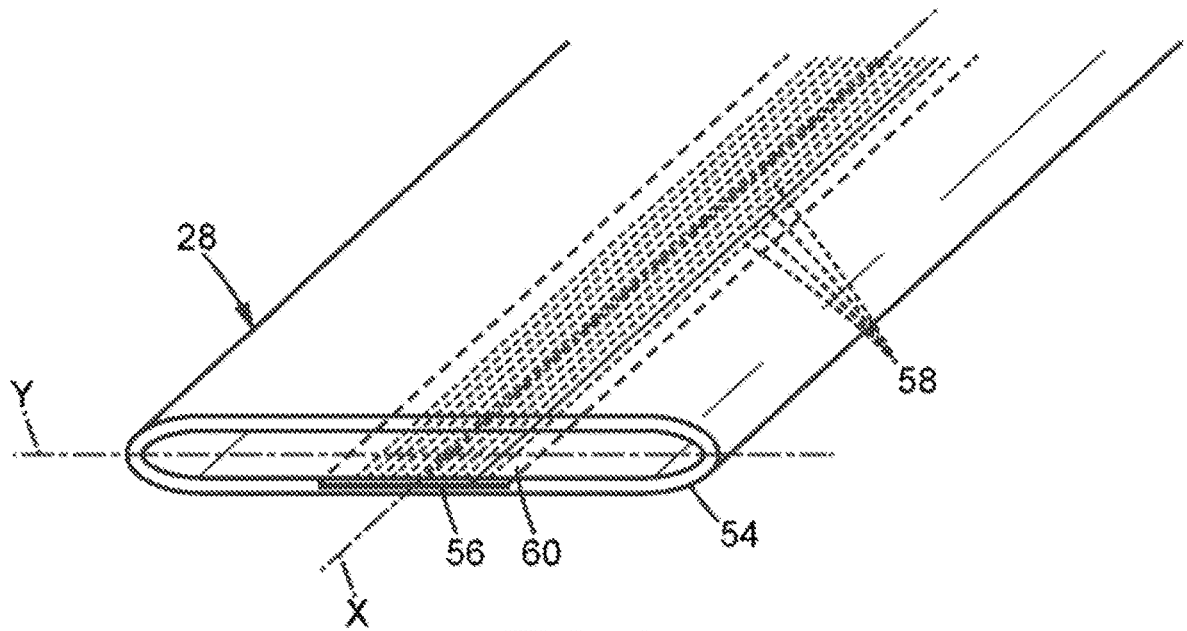
FIGS. 9 to 11 are schematic perspective views of the fourth, fifth and sixth examples of flap bodies that can be implemented in the device in FIG. 2.

FIG. 9 shows a fourth example of a flap body 28 that can be implemented in a flap 26 for a device 20 for shutting off an air inlet in the front face of a motor vehicle, as shown in FIG. 2.

As shown in this figure, the flap body 28 is tubular, here with a closed contour cross-section. More specifically, here, the flap body 28 is substantially cylindrical, with an oblong cross-section. The cross-section of the flap body 28 is for example oval or rectangular with rounded corners or even with two opposite rounded corners. In a variant, the cross-section of the flap body 28 can be another shape, the cross-section of the flap body 28 preferably being a closed contour shape 54 in order to ensure satisfactory stiffness of the flap body 28.

However, an insert 56 is incorporated into a portion of the closed contour 54. Here, this insert 56 takes the form of a plurality of fibers 58 embedded in a resin 60. The resin can be the same material as the one used to form the rest of the flap body 28. Alternatively, it can be a different resin. The resin 60 implemented is for example a thermoplastic resin, particularly polypropylene (PP) or polyamide (PA). These resins permit subsequent shaping or treatment steps, for example bending or welding. The fibers are for example glass fibers and/or carbon fibers. The fibers are preferably continuous fibers. The fibers extend, more preferably, parallel to the longitudinal direction X of the flap body 28.

Thus, according to this fourth example, the flap body 28 is made from a plastic material, in tubular form. A portion of the flap body 28 is reinforced with fibers, particularly continuous fibers, the fibers preferably extending in the longitudinal direction X of the flap body 28. Thus, the flap body 28 can be provided with no reinforcing fibers, apart from in the insert 56. The portion reinforced with fibers, of the flap body 28, can particularly be one or other, or even both, of the two largest faces of the flap body 28, which are substantially flat. These large faces of the flap body 28 are thus theoretically more flexible than the other faces of the flap 28, which have smaller areas and/or are curved, and are therefore naturally stiffer.

In the example shown in FIG. 9, the insert 56 is covered by material, particularly by material from which the contour 54 is made, with the exception of the insert 56. Alternatively, the insert 56 integrally forms a portion of the contour 54. In other words, it is possible for the insert 56 not to be covered by the material from which the rest of the contour 54 is formed. In another variant (not shown), the insert 56 is partially covered by the material from which the rest of the contour 54 is formed. The insert 56 can thus be covered on one of its faces or on two of its faces by the material from which the rest of the contour 54 is formed.

Figure 10:
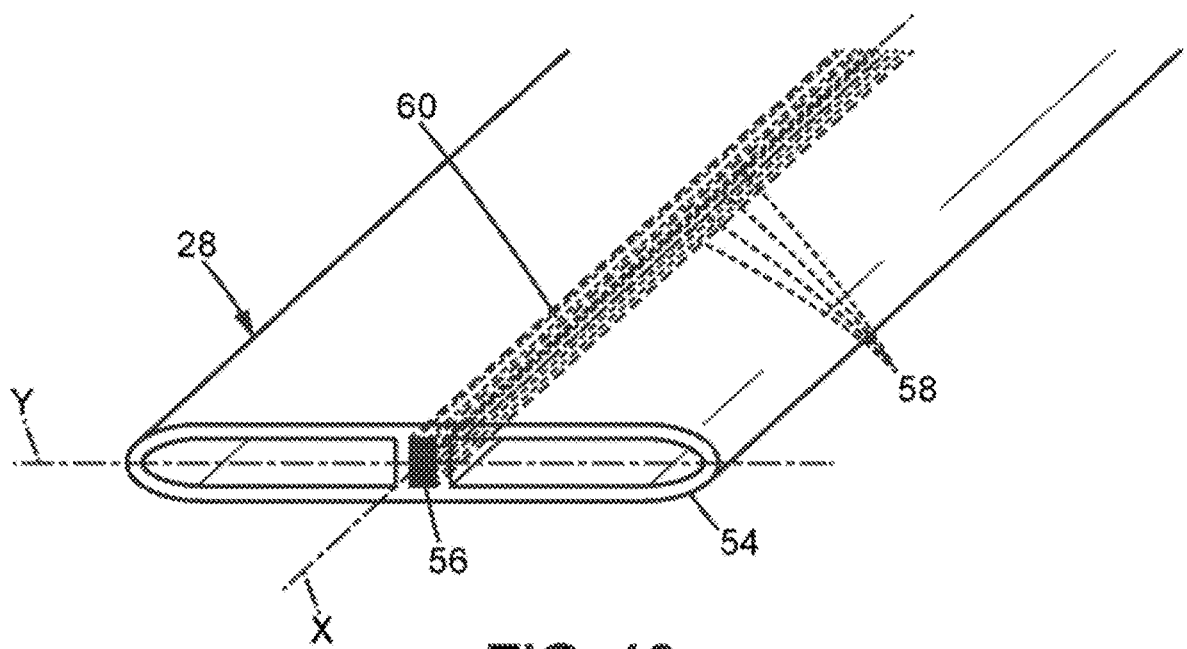

FIG. 10 shows a fifth example of a flap body 28 that can be implemented in the device in FIG. 2. This fifth example is a variant of the fourth example and essentially differs therefrom in that the insert 56 does not form a portion of the closed contour 54 of the flap body. Conversely, here, the insert 56 forms a web connecting two opposite faces of this closed contour 54. In this case, the two opposite faces of the closed contour 54, connected to each other by this web, are the two opposite faces with the largest areas. As shown, the insert 56 extends substantially between the mid-points of these two opposite faces, where the flap body 28 is theoretically the least stiff. Thus, the insert 56 extends here in the longitudinal direction X of the flap body 28.

Figure 11:
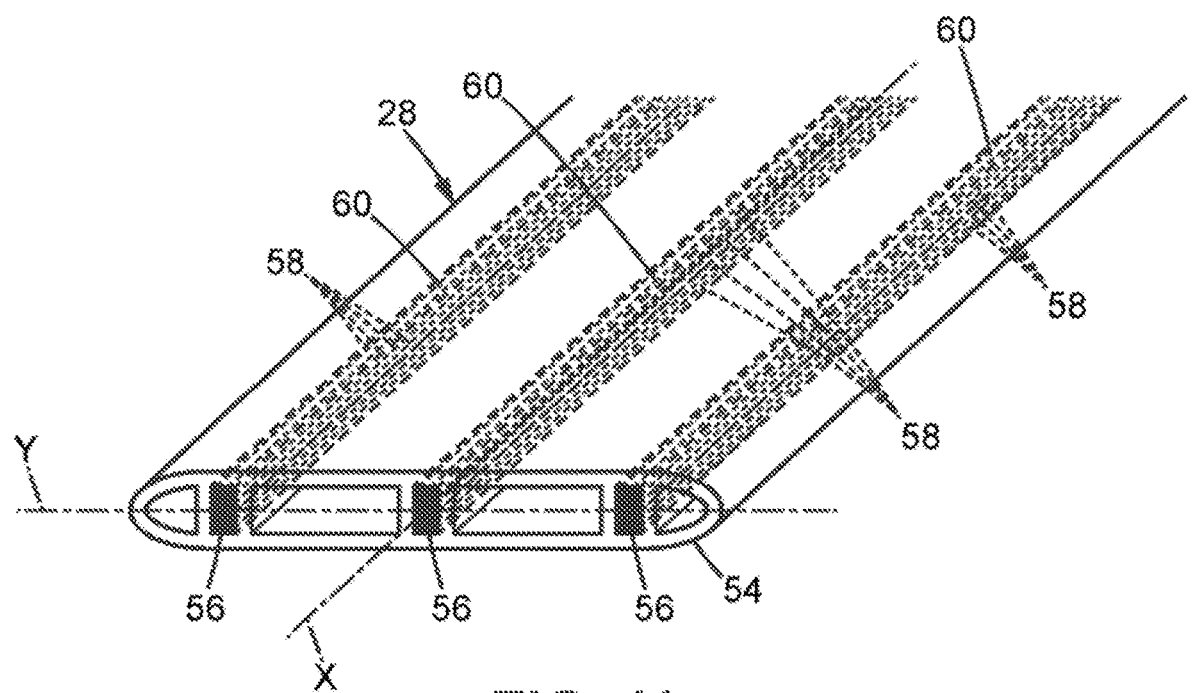

Finally, FIG. 11 shows a variant of the example in FIG. 10, comprising three inserts 56 each connecting the two opposite faces with the largest areas of the flap body 28. The three inserts 56 are substantially equally distributed over the width of these opposite faces of the flap body 28, in order to ensure substantially constant stiffness over the entire closed contour 54.

The three examples of a flap body 28 shown schematically in FIGS. 9 to 11 can particularly be produced by extrusion. The insert or inserts 56 can then be inserted into the flap body 28. For example, the insert or inserts 56 are coextruded with the rest of the flap body 28. In this case, the fibers 58 of the insert 56 can be pre-impregnated with resin 60, for example the same resin as the one implemented to produce the rest of the flap body 28. Alternatively, the fibers 58 can be dry until the process of extruding the flap body 28, and the fibers can only be impregnated at that time, for example by means of a resin 60, in particular a low-viscosity resin.

The invention is not limited to the embodiments described, and is capable of numerous variants accessible to a person skilled in the art.

For example, the reinforcing fibers can be non-continuous, i.e. they can have a length of less than 50 mm. However, continuous reinforcing fibers are preferred to improve the mechanical strength of the flap.

In addition, the flap body in the examples in FIGS. 4 and 5 has a hollow closed contour cross-section. However, the flap body can also be formed from a single strip or shell and then not have such a hollow closed contour cross-section. Such a hollow closed contour cross-section is however preferred to improve the mechanical strength of the flap.

The invention claimed is:

1. A shut-off flap for a motor vehicle shut-off device, for a device for shutting off an air inlet in the front face of a motor vehicle, comprising: a flap body, the flap body being at least partially made from a continuous fiber-reinforced composite material, wherein a fiber orientation in the fiber-reinforced composite material is one selected from a group consisting of:
   substantially in a longitudinal direction of the flap body,
   substantially in a transverse direction of the flap body, and
   substantially in two directions at two angles relative to the longitudinal direction of the flap body.

2. The shut-off flap as claimed in claim 1, wherein the flap body has a hollow closed contour cross-section.

3. The shut-off flap as claimed in claim 1, wherein the flap body comprises two strips fixed to each other, at least one of the two strips being made from a continuous fiber-reinforced composite material, each of the two strips being made from a fiber-reinforced composite material, particularly a continuous fiber reinforced composite material.

4. The shut-off flap as claimed in claim 1, wherein the flap body is monolithic.

5. The shut-off flap as claimed in claim 1, further comprising two end pieces attached to or integrally formed with the flap body, the two end pieces being made from a plastic material, the two end pieces enabling fixing of the shut-off flap to a frame of the shut-off device.

6. The shut-off flap as claimed in claim 1, in which the flap body comprises an insert made from a thermoplastic material with reinforcing fibers, continuous reinforcing fibers, the rest of the flap body being made from a plastic material without continuous reinforcing fibers.

7. The shut-off flap as claimed in claim 6, in which at least part of the flap is overmolded on the insert, the part forming a portion of the flap body and, ends of the shut-off flap forming protrusions for fixing the shut-off flap to a frame of the motor vehicle shut-off device for shutting off an air inlet in the front face of a motor vehicle.

8. The shut-off flap as claimed in claim 6, in which the flap body is hollow, with a closed contour cross-section, the flap body comprising at least one of an insert forming a portion of the closed contour or in a portion of the closed contour, and an insert extending between two opposite faces of the closed contour between the two opposite faces having the largest areas.

9. The shut-off flap as claimed in claim 8, comprising a plurality of inserts extending between two opposite faces of the closed contour the two opposite faces having the largest areas, the inserts being equally distributed in a transverse direction of the flap body, perpendicular to the direction of extension of the inserts.

10. The shut-off flap as claimed in claim 1, wherein the reinforcing fibers have a length of greater than 50 mm.

11. A motor vehicle shut-off device for shutting off an air inlet in the front face of a motor vehicle, comprising:
   a frame provided with at least one shut-off flap, the at least one shut-off flap comprising:
      a flap body, the flap body being at least partially made from a continuous fiber-reinforced composite material, wherein a fiber orientation in the fiber-reinforced composite material is one selected from a group consisting of:
         substantially in a longitudinal direction of the flap body,
         substantially in a transverse direction of the flap body, and
         substantially in two directions at two angles relative to the longitudinal direction of the flap body,
      the at least one shut-off flap being suitable for pivoting between at least an open position and a shut position; and
   at least one actuator suitable for controlling the pivoting of the shut-off flap relative to the frame about a longitudinal axis of the flap.

\* \* \* \* \*